Figure 1:
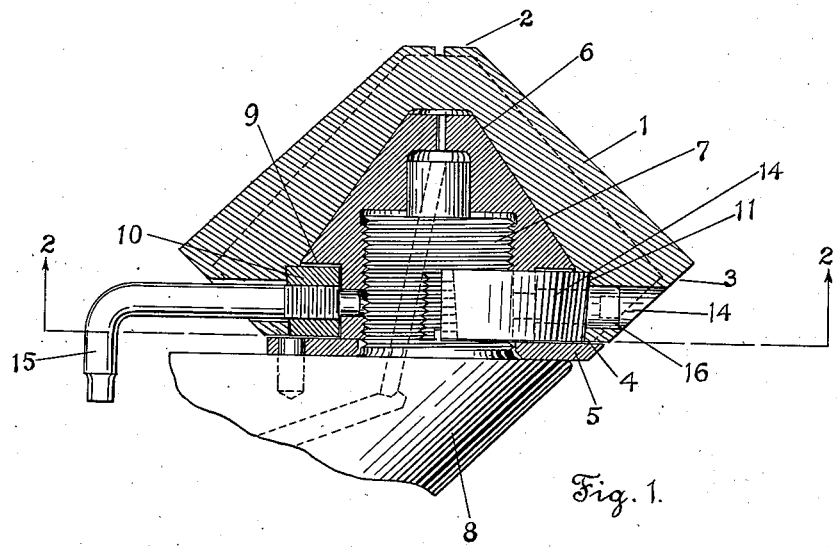

L. A. GODBOLD.
ROTARY CUTTER FOR ROLLER DRILLS.
APPLICATION FILED JUNE 16, 1919.

1,325,086.

Patented Dec. 16, 1919.

Louis A. Godbold, Inventor
By his Attorney Jesse R. Stone

UNITED STATES PATENT OFFICE.

LOUIS A. GODBOLD, OF HOUSTON, TEXAS.

ROTARY CUTTER FOR ROLLER-DRILLS.

1,325,086.  Specification of Letters Patent.  Patented Dec. 16, 1919.

Application filed June 16, 1919. Serial No. 304,507.

*To all whom it may concern:*

Be it known that I, LOUIS A. GODBOLD, a citizen of the United States, residing at Houston, Harris county, Texas, have invented a certain new and useful Improvement in Rotary Cutters for Roller-Drills, of which the following is a full, clear, and exact description, such as will enable others skilled in the art to which it appertains to make and use the same.

My invention relates to an improvement in locking means for securing a rotary cutter upon its bushing. It has special reference to a means of locking the cutter of a rotary drill bit upon the cutter shaft of the drill. This invention is a modification of my co-pending application filed jointly with another of even date herewith Serial No. 304,508 on an improvement in drill cutters for rotary boring drills.

The object of my invention is to provide a means for locking the rotary cutter rotatably upon its bushing. In this form of rotary drill the cutter is arranged to inclose the end of the bushing and the cutter shaft upon which it is mounted, and is retained on said bushing by means of a locking ring. This locking ring is ordinarily threaded onto the cutter and thereby maintained securely in contact therewith so as to retain the cutter on the bushing. In my improvement I contemplate locking the cutter by means of a ring which may be sprung into a tapered seat in said cutter and thus retain the same in position. Said ring is itself retained in expanded position on said cutter by virtue of a threaded set screw or other similar device.

In the drawings forming a part of this specification I have shown my preferred embodiment of this invention, it being understood, however, that slight modifications and changes may be made herein without departing from the spirit of the invention therein disclosed.

Figure 2:
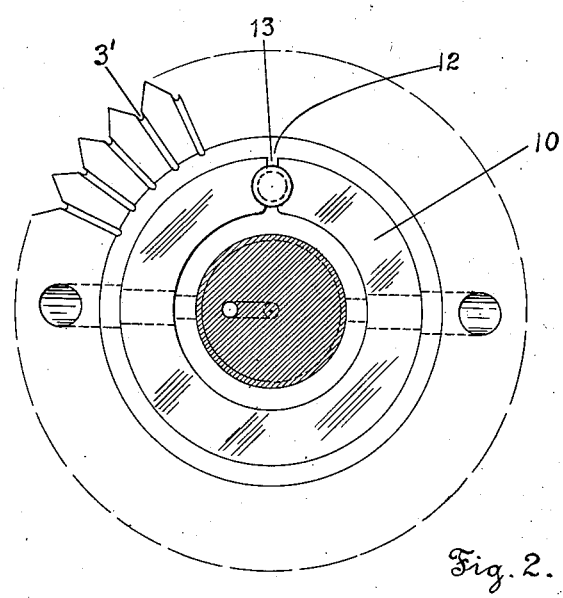

Figure 1 is a central longitudinal section illustrating the application of my invention to a frusto-conical shaped cutter. Fig. 2 is a bottom plan view, partly diagrammatic, further illustrating the same. Like numerals of reference are applied to like parts in both the views.

The cutter disclosed in the drawings is somewhat frusto-conical in shape, having a tapered cutting surface 1, the forward end of which is truncated to provide a flat forward face 2, also toothed to disintegrate the material coming into contact therewith. The inner end of the cutter is also tapered somewhat as shown at 3 and toothed at 3' to disintegrate material at the side of the hole against which this portion of the cutter is adapted to contact. The bottom or inner end portion of the cutter is flattened as shown at 4 for contact with an anti-friction washer 5.

The cutter is provided with a tapered recess on its inner face forming a smooth bearing surface for rotation upon a tapered bushing 6, said bushing being flattened on the forward end to correspond generally in shape with the cutter. This bushing is threaded interiorly upon a shaft or pin 7, which, in this embodiment, is integral with the forward end of the head 8 of the bit, not shown. The bushing 6 is cut away or recessed at 9 on its inner end to provide a seat for a locking ring 10, the coöperating inner face of the cutter is also recessed to bear against the outer face of the said locking ring 10. This cut-away portion 11 is tapered slightly inwardly, as shown in Fig. 1, and the locking ring 10 is wider on its upper end to fit, when expanded, within said tapered recess 11 in the cutter. The ring 10 is also split in one place, as shown at 12, to provide a space for contracting the ring when the same is to be inserted within its seat in the cutter.

In order to lock the ring securely in position within the tapered recess 11, a set screw 13 is used. Adjacent ends of the split ring 10 are recessed slightly to provide a tapered seat for this said set screw. This screw is tapered so as to have a wedge effect when threaded within the recesses in the ends of the split ring, thereby forcing them apart and holding the ring expanded firmly into the seat 11, on the inner face of the cutter. It will thus be apparent that when properly expanded the wider inner end of the ring will render it impossible for the ring to be forced from its seat and thus allow the cutter to be lost in the well.

It is contemplated that the ring can be fitted within its seat in the cutter, to hold the cutter and bushing 6 in assembled position, while the cutter is still in the shop. When the cutter, thus locked in position upon the bushing, is shipped to the field, where it is to be used upon the bit, all that will be necessary for the driller to do will be to screw the assembled cutter and bushing upon the threaded shaft 7 of the drill. In order to hold the cutter and locking ring non-rotatably upon the bushing, while the assembled cutter and bushing are being threaded upon the shaft, I have shown a tapered opening 14 in opposite sides of the cutter near the base thereof. This opening extends through the cutter, the locking ring and the bushing, so that a tapered pin or wrench 15 may be inserted therein so as to hold these elements, the cutter, the bushing, and locking ring together while the bushing is being threaded on the shaft. When the cutter has been secured in position, the wrench or pin 15 may be withdrawn and a set screw shown at 16 may be threaded into the alined openings in the locking ring and the cutter, thereby filling up the opening so as to prevent the entrance of water or grit about the bearings and serving also to lock the cutter and locking ring rotatably together, thus also further securing the locking ring within the recess 11 in the cutter.

In assembling the locking ring within the cutter the bushing will be first inserted in position within the cutter and the locking ring 10 will be contracted by having its ends forced tightly together, and in this contracted position its outer diameter will be small enough to pass within the outer diameter of the tapered seat 11 in the face of the cutter. It will then be released and resiliency of the ring will force it tightly into its seat. It will then be locked in expanded position by means of said set screw 13 as previously described. The cutter and locking ring will then be rotatable upon the bushing and the cutter will be held against removal from the bushing by the ring.

Having thus described my invention, the objects and advantages of which will be apparent without further description, what I claim as new and desire to protect by Letters Patent is:

1. In a roller drill bit, a cutter shaft, a bushing thereon, a cutter on said bushing, registering annular recesses in the inner faces of said bushing and said cutter, a split resilient ring in said recesses, and an expanding set screw adapted to retain said ring in expanded position.

2. In a drill bit, a bushing, a cutter thereon, inclosing the end of the same, said cutter and bushing being recessed to provide a seat for a ring, a split ring in said seat, said ring being wider toward the bottom of said seat, and means to prevent contraction of said ring.

3. In a roller drill bit, a cutter shaft, a bushing secured thereon, a cutter surrounding the end of said bushing, means to retain said cutter on said bushing comprising an annular groove on the upper adjacent faces of said cutter and said bushing, an expanding ring fitting in said groove and adapted to lock therein and means to retain said ring in expanded position.

In testimony whereof, I hereunto affix my signature this the 6 day of June, 1919.

LOUIS A. GODBOLD.